UNITED STATES PATENT OFFICE.

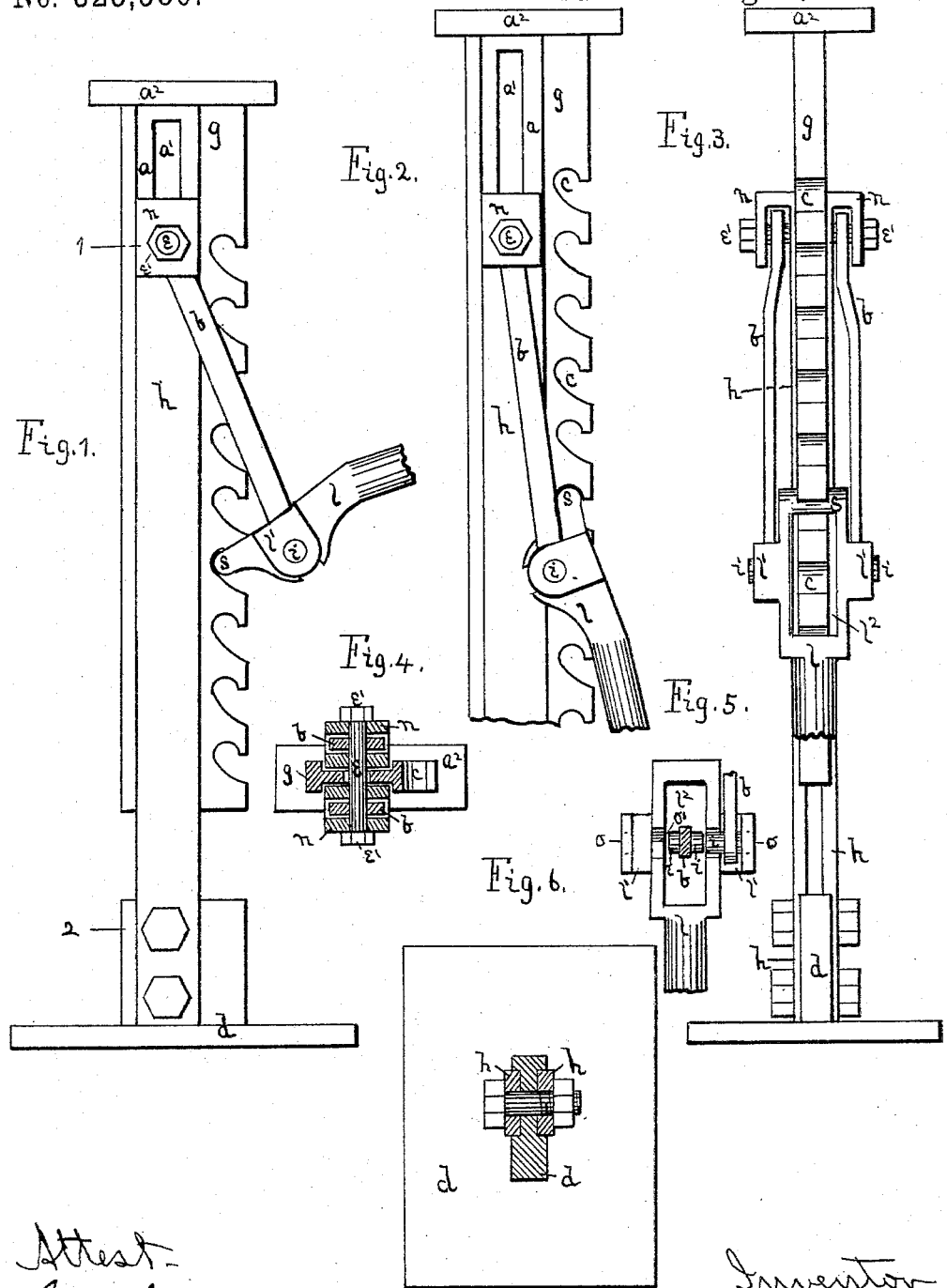

ADOLPH E. HERMAN, OF RAVENNA, OHIO.

LIFTING-JACK.

SPECIFICATION forming part of Letters Patent No. 323,580, dated August 4, 1885.

Application filed March 9, 1885. (No model.)

*To all whom it may concern:*

Be it known that I, ADOLPH E. HERMAN, a citizen of the United States, residing at Ravenna, in the county of Portage and State of Ohio, have invented a new and useful Improvement in Lifting-Jacks, of which the following is a specification.

In the drawings, forming a part of this specification, Figure 1 is a side elevation of the machine with the various parts in position for lifting. Fig. 2 is a like elevation of a part of the machine, representing the parts in position to hold an object when it has been lifted. Fig. 3 is an edge elevation of the machine with its parts in the same relative positions as shown in Fig. 2. Fig. 4 is a horizontal section of the machine at line 1 in Fig. 1. Fig. 5 represents the under side of lever $l$, with one of the links $b$ in place, and the other sectional and in position to be inserted in place, and Fig. 6 is a horizontal section of the machine at line 2 in Fig. 1.

The standard $d$ is of a single piece of casting, forming the base of the machine, and is grooved vertically on two opposite sides to receive guides $h\ h$, which are bars firmly bolted to the standard. The lifting-bar $g$ is cast in a single piece, formed with a suitable head, $a^2$, to bear against and support the object to be lifted, two grooves, $a$, on opposite sides of the bar to receive guides $h$, a slot, $a'$, and recesses or notches $c$ to engage with lever $l$. The upper ends of guides $h$ have lugs $n$, extending out and down to form, with the main body of the guide, double bearings for the short shaft or bolt $e$ on both sides of bar $g$. The links $b$ are hung or pivoted in these double bearings. Bolt $e$ is screw-threaded at one end and provided with a nut, $e'$, to hold the upper ends of guides $h$ in place in grooves $a$. Bolt $e$ extends through slot $a'$, which is of sufficient length to allow bar $g$ to be moved up and down the desired distance. Recesses or notches $c$ slant upward, and their upper part is of a semicircular form to permit the end bearing, $s$, of the short arm of lever $l$ to turn in them. The lower ends of the two links $b$ are pivoted to lever $l$, and are each formed with double bearings $i\ i$. Lever $l$ is also formed with two double bearings, $o\ o'$, to receive the link. The outer bearing, $o$, is formed in lug $l'$, and the inner bearing, $o'$, is open, in order that the end of link $b$, formed with corresponding bearings, $i\ i$, may be inserted in them, as shown in Fig. 5. Between the two double bearings $o\ o'$ lever $l$ is formed with a slot, $l^2$, for the notched side of bar $g$ to enter, in order that when an object has been lifted by pressing down lever $l$ to the position shown in Figs. 2 and 3 the bearing $s$ at the end of the lever may be out from a vertical plane through the lower bearings of the links, and thereby continue to hold up the weight and bar $g$ when lever $l$ is released from the hand.

In operating the lifting-jack herein described, the lever $l$ should be held out of notches $c$, while bar $g$ is slid up by hand in guides $h$ till the top $a^2$ of the bar is against the under side of the object to be lifted. The bearing $s$ of lever $l$ should then be let into one of the notches $c$ in the position shown in Fig. 1. By pressing down the outer arm of the lever bar $g$ is lifted. When lever $l$ has been thus pressed down until the lower bearings, $i$, of links $b$ have passed a vertical line through bearing $s$, the pressure of bar $g$ will force the lever against the notched side of the bar and hold it there.

I claim as my invention—

1. In a lifting-jack, lever $l$ and links $b$, in combination with guides $h$ and lifting-bar $g$, formed with notches $c$, substantially as described.

2. The lever $l$, formed with slot $l^2$ and end bearing, $s$, in combination, with links $b$, guides $h$, and bar $g$, formed with notches $c$, substantially as described.

3. The lever $l$, formed with slot $l^2$ and double bearings $o\ o'$ at each side of the slot, one of the bearings $o\ o'$ being open, in combination with links $b$, formed with bearings $i\ i$, guides $h$, and lifting-bar $g$, formed with notches $c$, substantially as described.

4. Guides $h$, formed with lugs $n$, and bolted to standard $d$, in combination with notched bar $g$, links $b$, and lever $l$, substantially as described.

5. The lifting-bar $g$, of a single piece, formed with a head, $a^2$, two opposite grooves, $a\ a$, slot $a'$, and notches $c$, in combination with guides $h$, bolt $e$, links $b$, and lever $l$, substantially as described.

6. The standard $d$, of a single piece of casting, forming a base, and grooved vertically on two opposite sides, in combination with and bolted to guides $h\ h$, substantially as described.

7. The lifting-bar $g$, formed with inclined notches $c$, whose upper parts are semicircular, in combination with lever $l$, formed with an end bearing, $s$, to fit and turn in the upper part of said notches, substantially as described.

ADOLPH E. HERMAN.

Attest:
J. T. RIDDLE,
BRADFORD HOWLAND.